Sept. 11, 1934.　　　M. W. McARDLE　　　1,973,175
AUTOMATIC TOASTER
Filed Sept. 16, 1930　　4 Sheets-Sheet 1
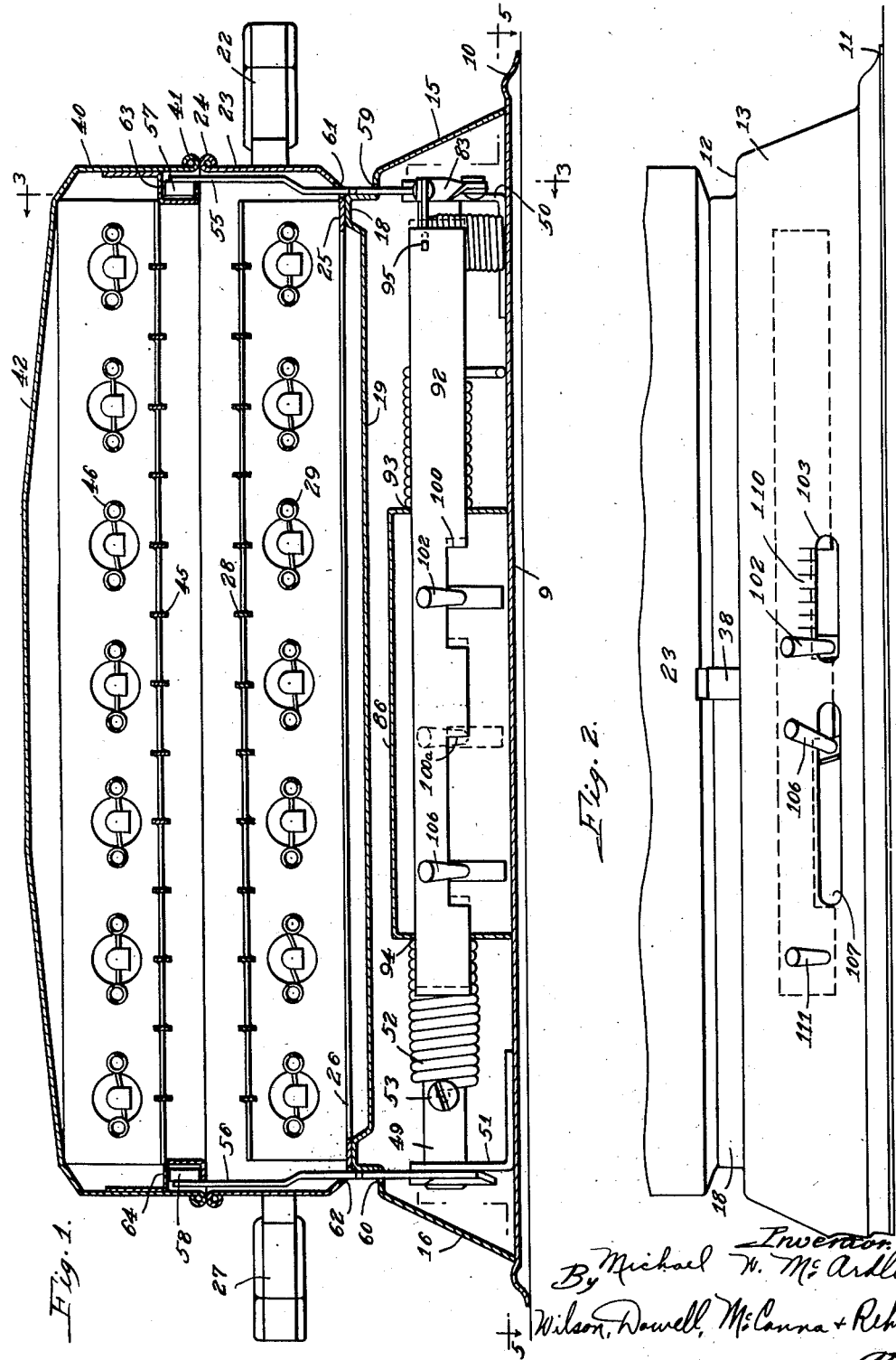

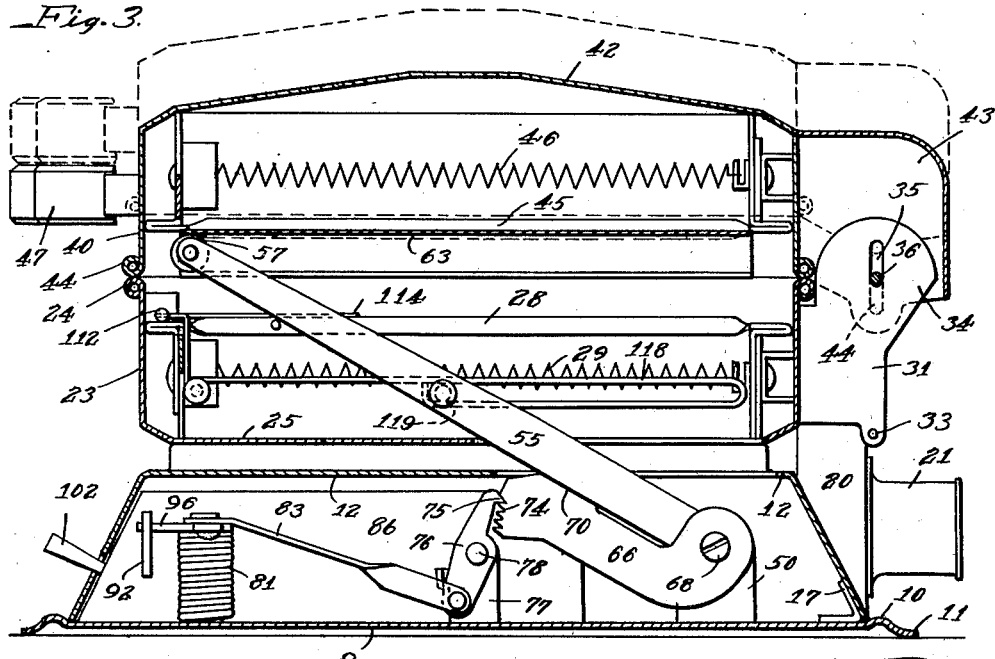

Sept. 11, 1934. M. W. McARDLE 1,973,175
AUTOMATIC TOASTER
Filed Sept. 16, 1930 4 Sheets-Sheet 3
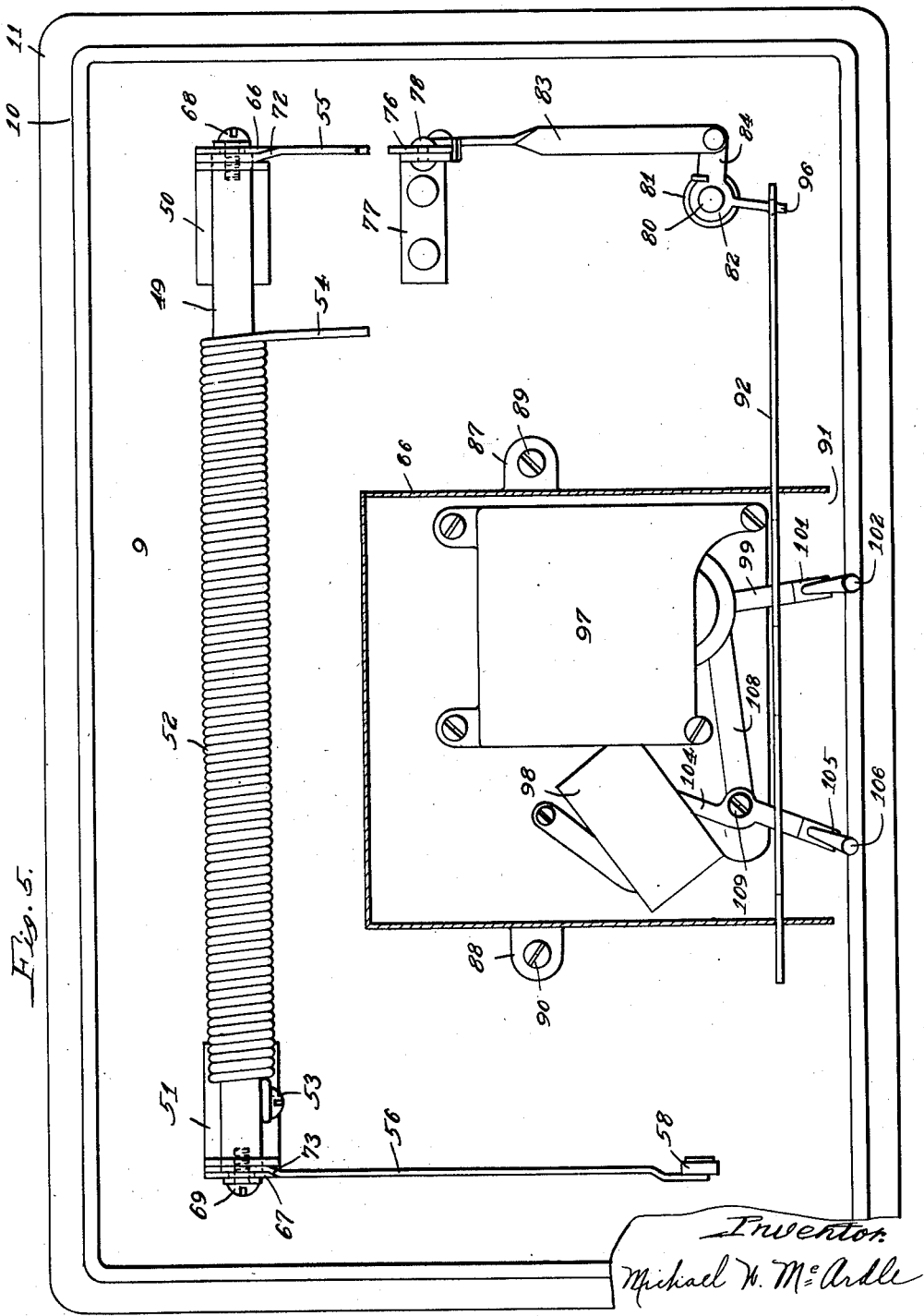

Sept. 11, 1934.                M. W. McARDLE                1,973,175
                               AUTOMATIC TOASTER
                    Filed Sept. 16, 1930        4 Sheets-Sheet 4
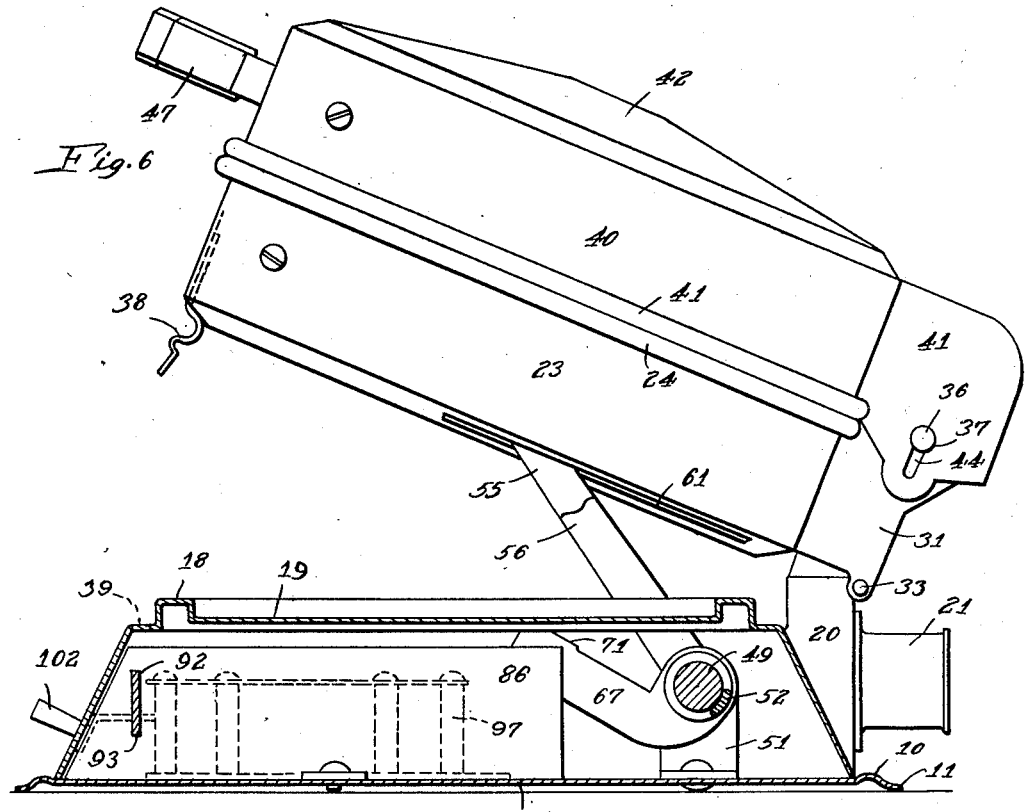
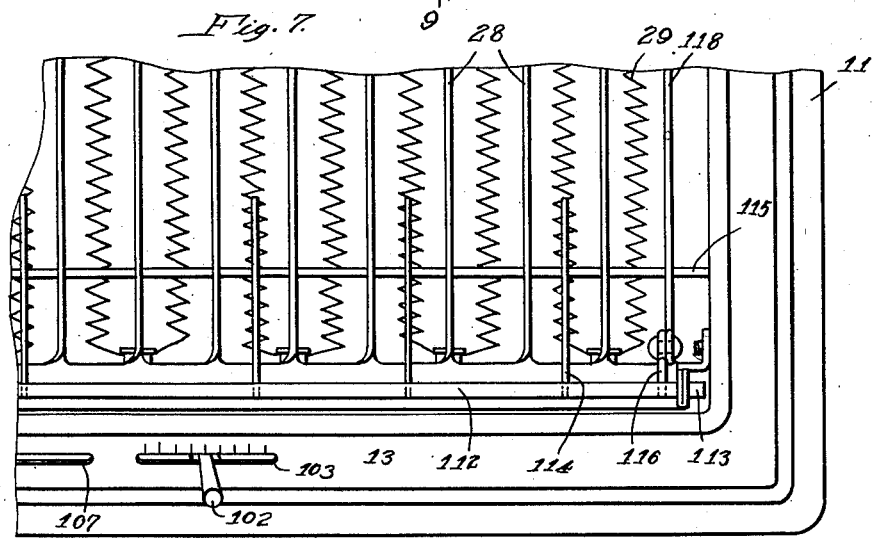
Inventor.
Michael W. McArdle
By Wilson, Dowell, McCanna + Rehm
Attys.

Patented Sept. 11, 1934

1,973,175

UNITED STATES PATENT OFFICE 1,973,175

AUTOMATIC TOASTER

Michael W. McArdle, Chicago, Ill.

Application September 16, 1930, Serial No. 482,232

11 Claims. (Cl. 53—5)

This invention relates to electrical toasting devices and has special reference to a toaster adapted to receive food objects of considerable variation in thickness and simultaneously toast the objects on both sides, the toaster being automatically opened when the toasting operations are complete.

Automatic toasters are now well-known in the art but all of those now being offered to the public are open to one or more serious objections. For example, one type of such toasters does not permit the toasting of more than a single slice of bread. In other words, a sandwich cannot be placed within the toaster to have the outer surfaces thereof toasted, because of the inflexibility of the toasting elements. Further, many of these toasters are arranged to receive a slice of bread in an edgewise position, the toasting elements being so arranged that small objects such as crackers and the like cannot satisfactorily be toasted therebetween. Another objection to the automatic toasters now known is the fact that the food object being toasted cannot be examined during the operation without completely destroying the setting of the timing clock. Thus if the operator desires to examine the food object being toasted, the timing mechanism must be disturbed to bring about a premature opening of the toaster. Another disadvantage of the toasters of the prior art is the fact that invariably the time regulating means must be reset before each toasting operation.

I have aimed to provide an automatic electric toaster wherein food objects of varying sizes may be toasted.

Another object of the invention is the provision of a toaster having horizontally opposed toasting elements and flexible means for pivotally connecting the two, whereby one or more slices of bread or one or more sandwiches may be toasted therebetween.

A further object of the invention is the provision of a toaster wherein the food object being toasted may be examined without removing it from the toaster or disturbing the timing mechanism.

I have also aimed to provide an automatic toaster wherein the time regulating mechanism need not be reset before each toasting operation, the time of successive toasting operations being regulated without further attention.

Another object of the invention is the provision of an electric toaster having automatic means for opening the same after the lapse of a predetermined time.

Another object of the invention is the provision of an automatic toaster having horizontally opposed toasting elements and improved means for tilting the food object upon the lower toasting element, whereby the same may be readily grasped by the operator.

Other objects and attendant advantages will become apparent to those skilled in the art from the following description and the accompanying drawings in which—

Figure 1 is a vertical longitudinal section through my improved toaster;

Fig. 2 is a front perspective of the base of the toaster;

Fig. 3 is a section on the line 3—3 of Fig. 1; showing, in dotted lines, the expanded position of the upper toasting element;

Fig. 4 is a view substantially the same as Fig. 3, with the upper toasting element moved to its open position;

Fig. 5 is a horizontal section substantially on the line 5—5 of Fig. 1;

Fig. 6 is an end view of the toaster showing the base thereof in section; and

Fig. 7 is a fragmentary top view of the toaster with the upper toasting element in its open position.

Referring now to Figs. 1 to 4, inclusive, the base consists of a base plate 9 of generally rectangular shape having the edges thereof crimped as shown at 10 to provide a peripheral supporting margin 11. A top, designated generally by the numeral 12, having front and rear walls 13 and 14 and end walls 15 and 16 formed integrally therewith, is secured to the base plate 9 in any suitable or desired manner, as for instance by angles 17. The top 12 may advantageously be provided with an upstanding peripheral margin 18 to form a centrally depressed reflector and refuse receptacle 19 as shown in Fig. 1. A bracket 20 is secured to the rear wall 14 of the base at a point substantially equi-distant from the ends thereof and serves to support a socket 21 adapted to receive a conventional electrical fitting for the delivery of current to the toaster.

A lower heating element includes a rectangular frame 23 having a coplaner rolled upper edge 24 and an inwardly projecting lower ledge 25 defining an opening 26 in the lower side of the toasting element. The ledge 25 of the lower element is adapted to rest upon the peripheral margin 18 for supporting the lower toasting element as shown in Fig. 1. Handles 22 and 27 may be secured to the frame on opposite ends to facilitate the handling of the toaster. A grid 28 and resistance element 29 of conventional design are secured within the frame 23 in any well-known or desirable manner, the grid 28 serving to support the food objects placed within the toasting element and prevent them from coming in contact with the electrically heated resistance elements 29, which are connected with the socket 21. A three sided hinge member 31 is secured to the side of the frame 23 above the bracket 20 and is pivotally secured thereto by means of ears 32 on the hinge member 31 and pins 33 on the bracket 20. The upper end of the hinge member is caused to project upward and backward to provide spaced ears 34 provided with complementary slots 35 adapted to receive a pin 36 for pivotally supporting an upper toasting element. A tongue 38 of spring steel is secured to the forward side of the frame 23 as shown in Fig. 6 and is adapted to frictionally engage an opening 39 on the base, to normally secure the frame thereto but to permit the lower toasting element to be rotated with respect to the base, about the pin 33, through the exertion of an abnormal lifting force upon the lower toasting element.

An upper toasting element includes a rectangular frame 40 having lower rolled edges 41 in contact with the rolled edges 24 and a reflector top 42. A hinge element having spaced side members 43 is secured to the frame 40 intermediate the ends thereof and above the hinge member 31 to receive the ears 34 thereof, the side members 43 having complemental slots 44 therein to receive the pin 36, the upper toasting element thus being hingedly supported on the hinge member 31. Collars 37 are situated on each end of the pin 36 to prevent it from coming out of the slots. A grid 45 and resistance element 46 are secured within the frame 40 in a conventional manner, the resistance element having suitable electrical connections with the socket 21. A handle 47 is fixedly secured on the forward side of the frame 40 in a position convenient for handling the upper toasting element.

Thus one or more slices of bread may be placed upon the grid 28 of the lower toasting element and the upper toasting element lowered to the position shown in Fig. 3. In this position the grid 45 will be substantially in contact with the upper surface of the bread. When current is caused to flow through the resistance elements 29 and 46 the bread interposed between the two toasting elements will be toasted simultaneously on opposite sides. However, should it be desired to toast sandwiches or the like of greater thickness than that of a single slice of bread, the sandwich may be placed upon the grid 28 in a similar manner and the upper toasting element lowered upon them. In this instance the grid 45 will come in contact with the upper surface of the food object thus interposed and the hinge element 43 will be lifted upward with respect to the pin 36, the slots 44 and 35 permitting such movement. The upper toasting element will then occupy the position shown in dotted lines in Fig. 3, whereupon heating of the resistance elements 29 and 46, will simultaneously toast both sides of the sandwich or other food product.

In order to bring about automatic operation of the toaster, that is, automatic lifting of the upper toasting element and automatic opening and closing of the circuit controlling the electrical resistance elements 29 and 46, I have provided a shaft 49 longitudinally positioned within the base of the toaster near the rear wall 14 thereof. The shaft 49 is rotatably positioned in brackets 50 and 51 secured to the base plate 9 in a conventional manner. A coiled spring 52 is secured at one end to the shaft 49 by means of a screw 53 and has the opposite end 54 thereof bearing against the base plate 9, the spring thus constantly urging the shaft 49 in a clockwise direction facing Figs. 3 and 4. Guiding arms 55 and 56 having rollers 57 and 58 secured to the upper ends thereof pass through slots 59 and 60 in the base and through slots 61 and 62 in the frame 23 of the lower toasting element, and are pivotally supported on opposite ends of the shaft 49. Channels 63 and 64 are secured to opposite ends of the upper toasting element frame 40 to receive the rollers 57 and 58 respectively and guide their movement along the frame during the movement of the upper toasting element between its open and closed position. Thus the upper toasting element may be rotated between its open and its closed position without in any way disturbing the shaft 49, the arms 55 and 56 merely rotating about the shaft 49 during this movement and the rollers 57 and 58 following along in the channels 63 and 64.

Lifting arms 66 and 67 are fixedly secured to the opposite ends of the shaft 49 by means of screws 68 and 69, which also serve to support the guiding arms 55 and 56 thereon. Shoulders 70 and 71 are provided on the edge of the lifting arms 66 and 67 to bear against the edges of guiding arms 55 and 56, the guiding arms being offset as shown at 72 and 73 to bring them into the same plane as the arms 66 and 67. Thus when the lifting arms 66 and 67 are left free to move with the shaft 49 under the influence of the spring 52, the shoulders 70 and 71 thereon will force the guiding arms 55 and 56 into the position shown in Fig. 4, thus lifting the upper toasting element. Manual movement of the upper toasting element will, however, force the levers 66 and 67 downward against the pressure of the spring 52. A series of notches 74 are provided on the upper end of the lifting member 66 adapted to be engaged by the point 75 of a pawl 76 pivotally supported upon a bracket 77 through a pin 78 therethrough. It will be seen that when the lifting arm 66 is moved downward against the pressure of the spring 52 by manual movement of the upper toasting element the point 75 of the pawl will engage one of the notches 74, whereby the lifting lever will be held in a position shown in Fig. 3, and the upper toasting element will occupy its closed position. It should be observed, however, that the upper toasting element may be raised to its open position without disturbing the lifting lever 66 since the guiding levers 55 and 56 are pivotally supported upon the rod 49. The upper toasting element will continue to occupy its closed position until the lifting lever 66 is released by operation of the pawl 76, at which time the lifting levers 66 and 67 will cause the upper toasting element to be automatically moved to its open position.

Automatic mechanism is provided in the base for actuating the pawl 76 after the lapse of a predetermined desired amount of time. This mechanism includes a vertical post 80 positioned in the base plate 9 and having a coiled spring 81 wound thereabout. A bell crank lever 82 is pivotally positioned upon the upper end of the pin 80, the spring 81 constantly urging the lever in a clockwise direction facing Fig. 5. A rod 83 connects one end 84 of the lever 82 to the pawl 76 in such wise that movement of the lever 82 under the action of the spring 81 tends to constantly urge the point 75 of the pawl to a position engaging the notches 74. A frame 86 is secured to the base plate 9 by means of ears 87 and 88 and screws 89 and 90, the forward end of the frame 86 being open as shown at 91, and the side walls substantially abutting against the inner surface of the front wall 13 of the base. A longitudinal bar 92 is slidably positioned in openings 93 and 94 in the frame 86 and is provided with an opening 95 at one end thereof to receive an arm 96 of the bell crank lever 82, the spring 81 serving to constantly urge the bar 92 to the left facing Figs. 1, 2 and 5. Movement of the bar 92 to the right causes rotation of the bell crank lever 82 in a counter-clockwise direction, rotating the pawl 76 in a counter-clockwise direction, releasing the lifting lever 66, and lifting the upper toasting element.

A clock 97 and a switch 98 within the casing 86 are arranged to cause the movement of the bar 92 to the right after the lapse of a predetermined time, the switch 98 having suitable electrical connections with the socket 21 and the resistance elements 29 and 46. A rod 99 projects outward from the clock 97 through a slot 100 in the bar 92 and is bent downward at its outer end 101 parallel with the forward wall 13 of the base. A pin 102, secured to the rod 99, projects through an opening 103 in the front wall 13 of the base and serves as an indicating means and as a handle for operating the rod 99. A second rod 104 projects outward from the switch 98 through a slot 100a in the rod 92 and also has a portion 105 parallel with the front wall 13 of the base. A second pin 106 secured to the portion 105 projects through a second opening 107 in the forward wall 13 and serves as a handle for actuating the switch 98. A rod 108 is pivotally connected to the rod 104 by means of a screw 109 and serves to connect the operation of the switch 98 with the clock mechanism 97. A scale 110 is provided on the outer face of the wall 13 to permit the pin 102 to be set at a desired position dependent upon the length of time desired for the operation of the toaster.

The clock 97 is of conventional design and so arranged as to beat off a certain period of time dependent upon the position of the pin 102, the rod 108 drawing the lever 104 gradually to the right as the time is beat off. When the predetermined period of time has been beat off by the clock 97, the rod 108 is rapidly drawn to the right thus rapidly drawing the rod 104 to the right until it reaches its furthermost position as shown in Fig. 2. To start the clock mechanism the pin 102 is set at the required point on the graduated scale 110 and the pin 106 is moved toward the left facing Figs. 2 and 5 to the end of the opening 107, a pin 111 permitting this to be done by placing one finger on the pin 111 and one finger on the pin 106 and bringing the fingers together. As this occurs the clock 97 is wound and the switch 98 is closed, closing the circuit through the resistance elements 29 and 46. At this point the clock 97 begins to beat off the required period of time, the rod 108 gradually drawing the rod 104 and the pin 106 to the right. When the right amount of time has been beat off the rod 104 is quickly brought to the right, into the position shown in dotted lines in Fig. 1 then the rod 104 comes into contact with the bar 92 at the end of this rapid stroke, it moves the bar 92 to the right, releasing the pawl 76 from the lifting lever 66, and thereby raising the upper toasting element. The moved position of the bar 92 is indicated by dotted lines in Fig. 1.

In order to lift the toasted food object from the grid 28 and facilitate the removal of the toasted food from the toaster, I have provided a toast lifting rack including a rod 112 extending lengthwise of the lower toasting element just within the frame 23 as shown in Figs. 4 and 7. The rod 112 is pivotally supported at each end in the grid 28 as shown at 113. A plurality of fingers 114 project outward from the rod 112 and normally lie in the same plane as the grid 28. A rod 115 extends longitudinally through the grid 28 and serves to support the fingers 114 and prevent them from coming in contact with the resistance element 29. A rod 116 is caused to project outward and downward as shown in Fig. 4 at right angles to the fingers 114 and is pivotally connected at its lower end with a rod 117 having a loop 118 at its opposite end. A button 119 is secured to the guiding arm 55 and positioned within the loop 118, the button normally sliding backward and forward within the loop 118 as the upper toasting element moves between its closed and its opened position. The horizontal position of the fingers 114 is not disturbed until the button 119 comes against the end of the loop 118 during the upward movement of the upper toasting element. However, when this occurs the rod 116 is drawn outward rotating the rod 112 and raising the fingers 114 to the position shown in Fig. 4, whereby the forward edge of the toast or other food object positioned between the toasting elements is raised so that it may be readily grasped with the fingers without danger of accidental burns.

The advantages of my improved construction will have become apparent to those skilled in the art. I have provided a pair of horizontally disposed toasting elements wherein the upper toasted element is pivotally supported upon the lower through expansible means whereby food objects of varying thicknesses may be interposed therebetween. I have provided mechanism for automatically lifting the upper toasting element after the lapse of a predetermined time and for raising the forward edge of the food object so that it may be readily removed from the toaster. Means are provided for automatically opening the circuit of the resistance elements when the upper toasting element is raised to its open position.

Through the guiding arms 55 and 56 I have provided means whereby the upper toasting element may be lifted to an open or partially open position for the purpose of examining the condition of the food object being toasted without interfering with the time setting or the automatic operation thereof.

It will be seen that the pin 102 may be placed at a desired position with respect to the scale 110 and need not be disturbed during successive toasting operations, it only being necessary at each toasting operation to draw the pin 106 to the left end of the opening 107 to reset the mechanism for a subsequent toasting operation.

The crumbs and other refuse from the toasting operations will drop through the grid 28 into the receptacle 19, from which they may be readily removed by rotation of the lower toasting element about the pin 33 which completely exposes the top of the base to permit any required cleaning operations.

While I have thus described and illustrated a specific embodiment of my invention I am aware that numerous alterations and changes may be made therein without departing from the spirit of the invention and I do not wish to be limited except as required by the prior art and the scope of the appended claims in which—

I claim:

1. A toaster comprising, in combination, an upper and a lower toasting element for receiving a food object therebetween, a hollow base, pivotal means for supporting said upper element to move between an open and a closed position, at least one guiding arm, operating through said lower element, means in said base for pivotally supporting one end of said arm, means on said upper toasting element for slidably receiving the opposite end of said arm to slide thereupon when said upper element moves between said positions, spring operated means in said base acting upon said guiding arm to rotate the latter for moving said upper element from the closed to the open position and holding said element in said open position, and manually adjustable means in said base for actuating said last mentioned means at a predetermined time.

2. A toaster comprising, in combination, an upper and a lower toasting element for receiving a food product therebetween, pivotal means for supporting said upper element to move between an open and a closed position, at least one guiding arm, means for pivotally supporting one end of said guiding arm, means on said upper element for slidably receiving the opposite end of said arm to slide thereupon when said upper element moves between said positions, at least one lifting arm for rotating said guiding arm by contact therewith to move said upper element from the closed to the open position, means for holding said lifting arm in a retracted position when said upper toasting element occupies its closed position, and time controlled means for releasing said lifting arm to move said upper element to the open position.

3. A toaster comprising in combination, substantially parallel horizontally disposed upper and lower toasting elements for receiving a food object therebetween, a hollow base for supporting said elements, pivotal means on the lower element for supporting said upper element to rotate thereon between a closed and an open position, and means for rotating said upper element comprising spring actuated rotatable arms passing through said lower element and concealed thereby, and time controlled mechanism in said base for retaining and releasing said rotatable arms.

4. A toaster comprising in combination, substantially parallel horizontally disposed upper and lower toasting elements, a hollow base for supporting said elements, pivotal means for supporting said upper element to rotate between a closed and an open position, and means for rotating said upper element comprising at least one arm extending through said lower element, one end of said arm being rotatably supported in said base and the other end thereof having slidable engagement with said upper element, and time controlled means for rotating said arm to lift said upper element to its open position.

5. A toaster comprising in combination, a hollow base, a lower toasting element resting upon said base having enclosed sides and an open top, an upper toasting element having an enclosed top and sides and an open bottom normally resting upon said lower element, means for pivotally supporting said upper element to move between closed and open positions, an arm adjacent each end of said toaster extending from said base to opposite ends of said upper element substantially completely enclosed within said base and the sides of said elements, means in said base for rotatably supporting said arms, and time controlled means acting against each of said arms intermediate the point of support and said upper element to move said upper element to its open position.

6. A toaster comprising in combination, a hollow base, a lower toasting element resting upon said base having enclosed sides and an open top, an upper toasting element having an enclosed top and sides and an open bottom normally resting upon said lower element, means for pivotally supporting said upper element to move between closed and open positions, an arm adjacent each end of said toaster extending from said base to opposite ends of said upper element substantially completely enclosed within said base and the sides of said elements, means in said base for rotatably supporting said arms, spring actuated levers positioned in fixed relation to act against each of said arms to open said upper element and to be re-tensioned upon manual return of said element, and a time controlled pawl for releasing said lever at a predetermined time and for retaining said lever when said element is manually moved to its closed position.

7. A toaster comprising in combination, a hollow base, a lower toasting element resting upon said base having enclosed sides and an open top, an upper toasting element having an enclosed top and sides and an open bottom normally resting upon said lower element, means for pivotally supporting said upper element to move between closed and open positions, an arm adjacent each end of said toaster extending from said base to opposite ends of said upper element substantially completely enclosed within said base and the sides of said elements, a shaft in said base, an arm rotatably positioned on each end of said shaft extending to opposite ends of said upper element and substantially completely enclosed within said base and the sides of said elements, a spring acting to cause rotation of said shaft, levers fixedly connected to each end of said shaft positioned and shaped to bear against said arms to open said upper element under the tension of said spring and to retension said spring on manual return of said element, and a time controlled pawl for releasing said levers at a predetermined time and for retaining said levers when said element is returned to its closed position.

8. A toaster comprising, in combination, substantially parallel horizontally disposed upper and lower toasting elements, means for supporting said upper element for movement with respect to the lower element, a hollow base of a size and shape resembling that of said elements for supporting said elements, a shaft in said base extending lengthwise thereof substantially the length of said elements, lifting mechanism on opposite ends of said shaft extending through said lower element and having sliding contact with said upper element, spring means for rotating said shaft and said lifting mechanism to move said upper element to an open position, and time controlled means for retaining said lifting mechanism against rotation by said spring and for releasing it for such rotation.

9. A toaster comprising, in combination, substantially parallel horizontally disposed upper and lower toasting elements, means for supporting said upper element for movement with respect to the lower element, a hollow base of a size and shape resembling that of said elements for supporting said elements, a shaft in said base extending lengthwise thereof substantially the length of said elements, lifting mechanism on opposite ends of said shaft extending through said lower element and having sliding contact with said upper element, a coiled spring wound on said shaft for rotating said shaft and said lifting mechanism in a direction to open said upper element, and time controlled means for retaining said lifting mechanism against rotation by said spring and for releasing it for such rotation.

10. In a toaster having a base, substantially parallel horizontally disposed upper and lower toasting elements, and time controlled means for rotating said upper element on a horizontal axis to open said toaster, wherein a rotatable arm extends from said base to said upper element, a toast lifter comprising a rack pivotally supported on said lower element near the front thereof and having a plurality of rearwardly extending fingers normally lying in the plane of said element, and a lost motion connection between said rack and said arm to rotate said rack and lift said fingers when said upper element moves into its open position.

11. In a toaster having a base, substantially parallel horizontally disposed upper and lower toasting elements, and time controlled means for rotating said upper element on a horizontal axis to open said toaster, wherein a rotatable arm extends from said base to said upper element, a toast lifter comprising a rack pivotally supported on said lower element near the front thereof and having a plurality of short rearwardly extending fingers of such length as to extend less than half the distance across said lower element, said fingers normally lying in the plane of said element, and a lost motion connection between said rack and said arm to rotate said rack and lift said fingers when said upper element moves into its open position.

MICHAEL W. McARDLE.